(12) United States Patent
Morency et al.

(10) Patent No.: US 10,239,210 B2
(45) Date of Patent: Mar. 26, 2019

(54) VISION-ASSISTED SYSTEM AND METHOD FOR PICKING OF RUBBER BALES IN A BIN

(71) Applicant: SYMBOTIC CANADA ULC, Montreal (CA)

(72) Inventors: Sylvain-Paul Morency, Montreal (CA); Marc Ducharme, Montreal (CA); Robert Jodoin, Montreal (CA); Christian Simon, Montreal (CA); Jonathan Fournier, Montreal (CA); Sebastien Lemay, Montreal (CA)

(73) Assignee: Symbotic Canada ULC, Montreal (CA)

( * ) Notice: Subject to any disclaimer, the term of this patent is extended or adjusted under 35 U.S.C. 154(b) by 255 days.

(21) Appl. No.: 14/682,955

(22) Filed: Apr. 9, 2015

(65) Prior Publication Data

US 2015/0290805 A1 Oct. 15, 2015

Related U.S. Application Data

(60) Provisional application No. 61/978,232, filed on Apr. 11, 2014.

(51) Int. Cl.
*B25J 9/16* (2006.01)
*G06F 17/50* (2006.01)

(52) U.S. Cl.
CPC ... *B25J 9/1679* (2013.01); *G05B 2219/37555* (2013.01); *G05B 2219/40053* (2013.01); *Y10S 901/02* (2013.01); *Y10S 901/31* (2013.01); *Y10S 901/47* (2013.01)

(58) Field of Classification Search
CPC .................................. G06F 17/50; G06F 3/011
USPC ........................................................ 700/99
See application file for complete search history.

(56) References Cited

U.S. PATENT DOCUMENTS

| | | | | |
|---|---|---|---|---|
| 5,506,682 | A * | 4/1996 | Pryor | A01B 69/008 356/400 |
| 6,224,122 | B1 * | 5/2001 | Glenn | B66C 1/445 294/106 |
| 8,908,913 | B2 * | 12/2014 | Taguchi | G06T 7/521 382/103 |
| 9,008,841 | B2 * | 4/2015 | Fuhlbrigge | B25J 9/1687 700/253 |
| 9,102,055 | B1 * | 8/2015 | Konolige | B25J 9/163 |
| 9,227,323 | B1 * | 1/2016 | Konolige | B25J 9/163 |
| 2011/0222995 | A1 | 9/2011 | Irie et al. | |
| 2012/0165986 | A1 | 6/2012 | Fuhlbrigge et al. | |

* cited by examiner

*Primary Examiner* — Michael Rutland Wallis
(74) *Attorney, Agent, or Firm* — Perman & Green, LLP

(57) ABSTRACT

The problem of picking tightly-pack generally uniformed products such as rubber bales in a bin is solved by sequentially selecting each one of the products based on the products depths in the bin, using a robot with a tool to grip each selected product, and moving on an output station each gripped product considering its position relative to the gripping tool. A first sensor system is used to determine the product depths in the bin. The sensor system can be mounted on the robot tool or be positioned above the bin. The position of each gripped product in the gripping tool is achieved by analyzing an image of the gripped product in the gripping tool.

26 Claims, 6 Drawing Sheets

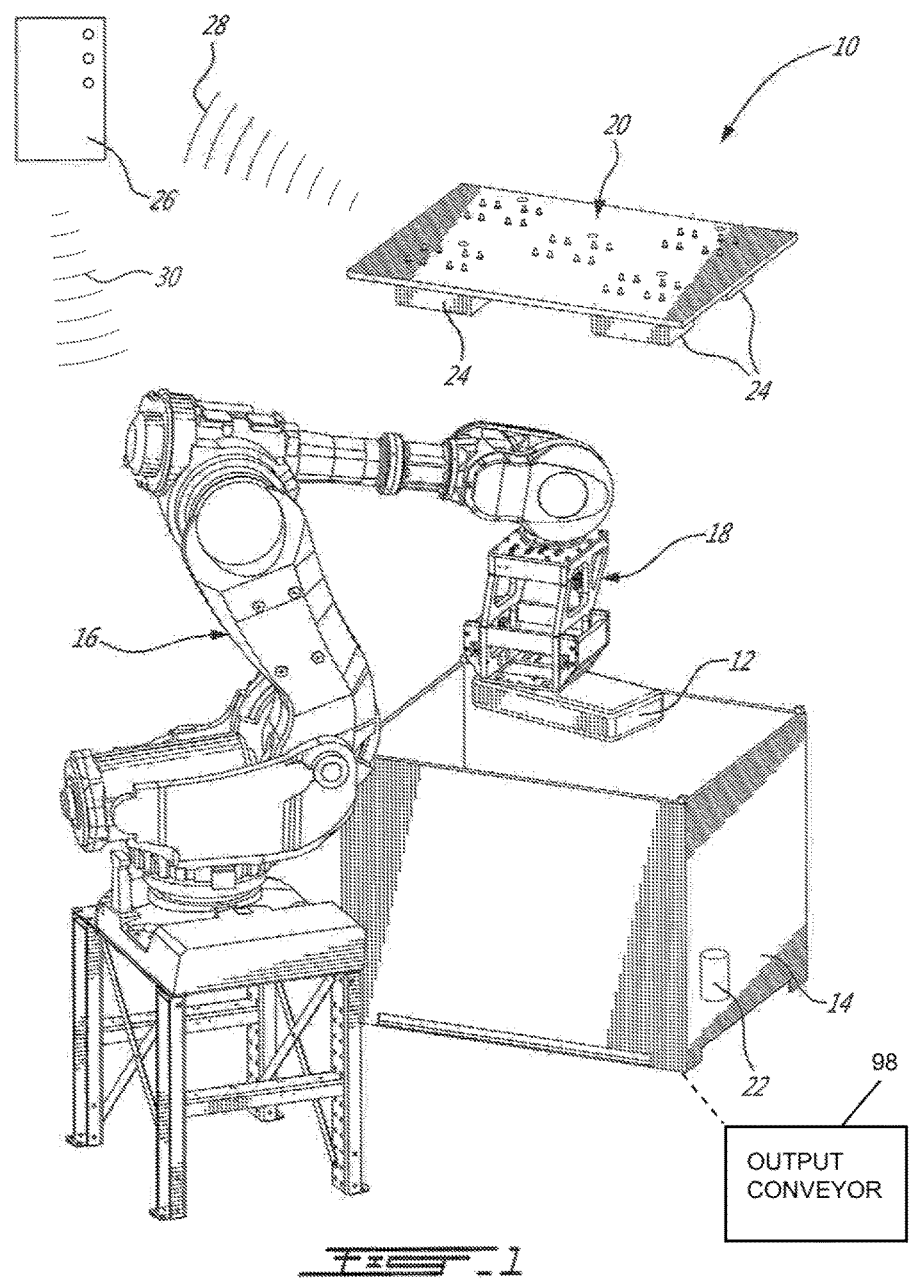

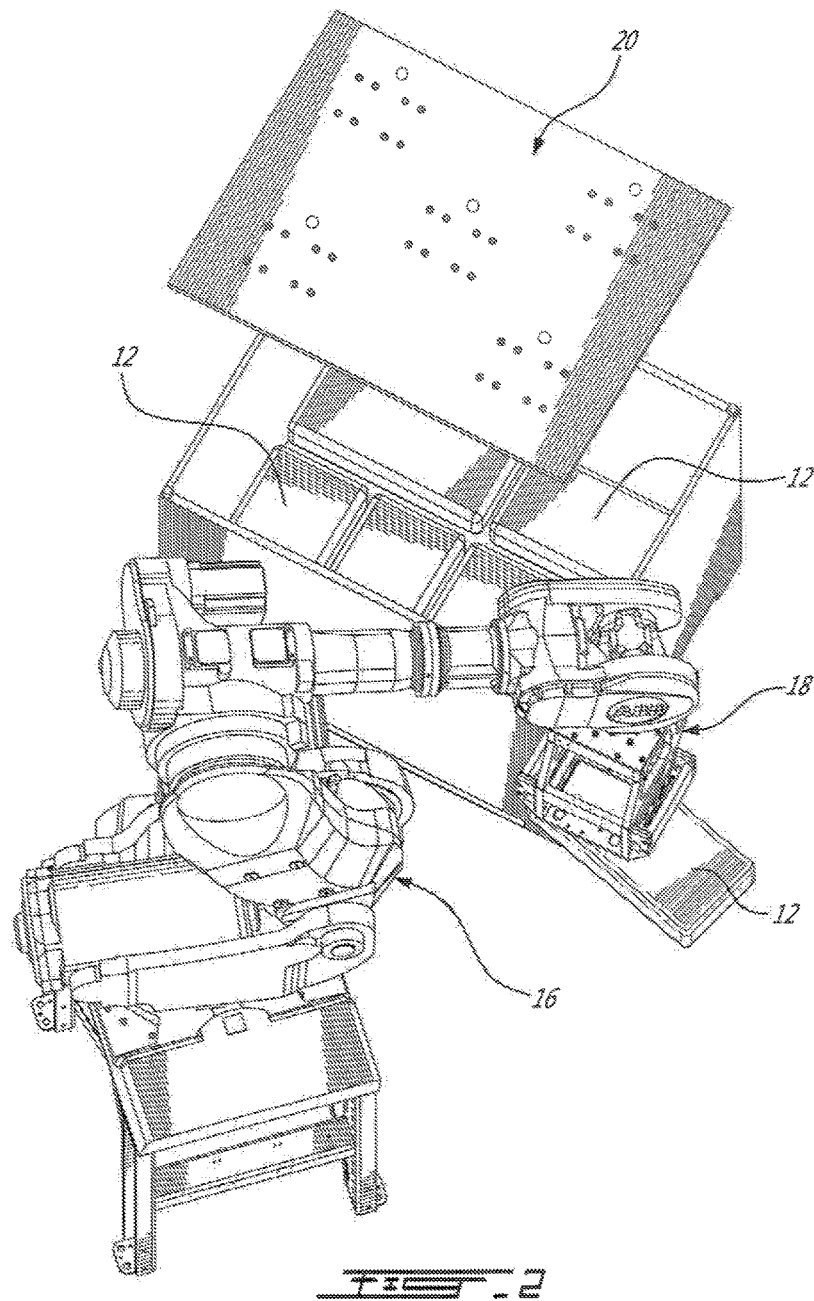

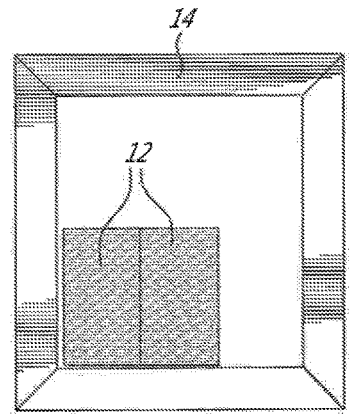 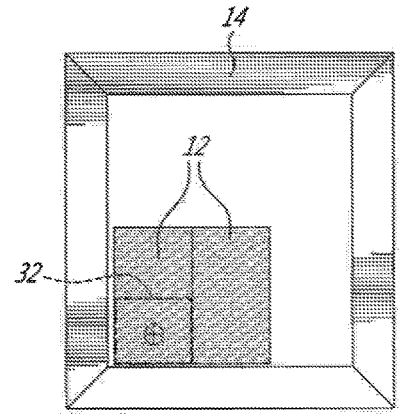
FIG. 3A         FIG. 3B
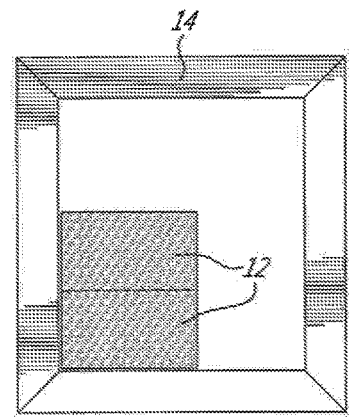 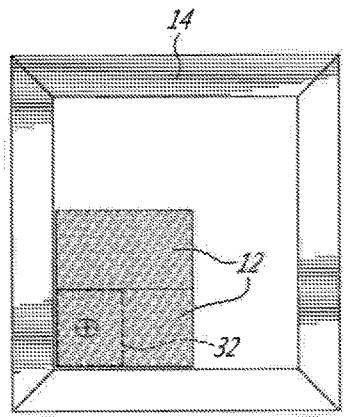
FIG. 4A         FIG. 4B

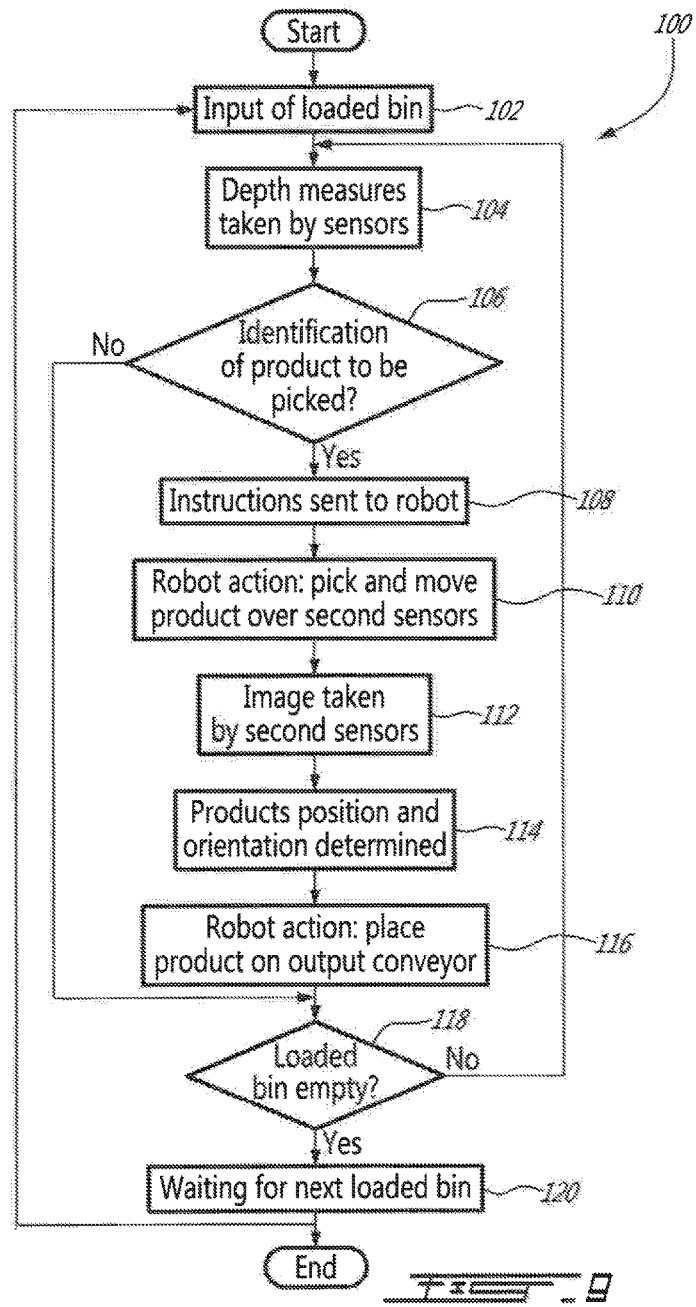

VISION-ASSISTED SYSTEM AND METHOD FOR PICKING OF RUBBER BALES IN A BIN

CROSS REFERENCE TO RELATED PATENT APPLICATION

This U.S. patent relates to and claims priority to corresponding U.S. Provisional Patent Application No. 61/978,232, which was filed on Apr. 11, 2014, and the entire disclosure is incorporated herein by reference.

FIELD

The present disclosure relates to bin picking, and more specifically to vision-assisted system and method for picking of rubber bales in a bin.

BACKGROUND

Rubber product manufacturers typically receive their raw material in the form of rubber bales that are usually received in large bins. Of course, at one point the bales have to be taken from the bins to feed the fabrication process. Traditionally, those bales are manually removed from the bin, which is physically difficult and time consuming. Some manufacturers use vacuum tools coupled with a gantry type hoist to pick the rubber bales. While this approach is not as physically demanding as the fully manual operation, it still requires manual labor to guide the hoist. Also, the bales located at the bottom of the bin are typically difficult to reach.

Various bin picking technologies are available, but they are designed for small identical parts that are randomly distributed in the bin. Those technologies are not suited to pick rubber bales because, while the bales are orderly placed in the bin, a challenge is to determine their position as the contour of each bale is not obvious to determine, even for the human eye. A sensor system and method typically used for picking of randomly placed objects in a bin would therefore be inappropriate in a rubber bale picking application.

The problems inherent in both identifying and gripping a rubber bale in a bin yield uncertainties in the rubber bale holding condition. This is a drawback considering that a picked bale is to be correctly positioned in an output station.

United States Patent publication no. 2011/0222995 A1, published on Sep. 15, 2011, naming Irie et al. as the inventors and being titled "Robot System and Transfer Method" describes a robot system and method where a shape sensor detects shape information of products randomly placed in a container and an inspection device determines the holding condition of the workpiece by the robot. In the case where the holding condition of the workpiece is found unacceptable, the workpiece is placed on a temporary placement table. The shape sensor is used a second time to detect the workpiece before instructing the robot to retake it.

While the approach taken by Irie et al may be appropriate to pick products that are piled in a bin in an unarranged manner, the proposed shape sensor would be inappropriate to detect edges of the bales considering that there is typically no gap between the rubber bales. This is in addition to Irie's gripping tool that would also be inappropriate for rubber bales. Furthermore, the use of a temporary placement table is detrimental for cycle time reduction purposes.

United States Patent publication no. 2012/0165986 A1, published on Jun. 28, 2012 to Fuhlbrigge et al. and being titles "Robotic picking of parts from a parts holding bin" describes a robot system and method where an image from one or more cameras are used to determine if a robot gripper has picked one or more parts and the position and orientation of the picked part.

The approach taken by Fuhlbrigge et al. is based on the possibility that the gripper can hold more than one part or to return the picked part in the bin if its position and orientation does not meet a predetermined criteria. It is designed for parts that are randomly distributed in a bin and that can therefore be interlocked with each other, which cannot happen for rubber bales. For cycle time purposes, it is preferable to have a system and a method that only picks one part and does not have to return it to the bin regardless of its position and orientation in the gripper.

A system and method that allows bin picking of orderly positioned rubber bales is thus desirable.

SUMMARY

The problem of picking tightly-pack generally uniformed products in a bin is solved by sequentially selecting each one of the products based on the products depths in the bin, using a tool to grip each selected product, and moving on an output station each gripped product considering its position relative to the gripping tool.

According to an illustrative embodiment, there is provided a system for picking products in a container, the system comprising:

a first sensor system to obtain an image of upper products in the container and to use the image in determining position-related information on the upper products; the upper products being the products in the container that are visible from above the container;

a robot coupled to the first sensor system for receiving therefrom the position-related information on the upper products and for using the position-related information on the upper products for sequentially gripping the upper products; and a second sensor system for determining a position of each of the upper products relative to the robot when said each of the upper products is gripped by the robot; and the robot being further configured to use information indicative of the position determined by the second sensor to position at a selected location the upper product that is gripped by the robot.

According to another illustrative embodiment, there is provided a robot, equipped with an end of arm tool, that uses position-related information on products in a bin that are visible from above the bin to sequentially pick the visible products, and, while each visible product is being picked, that moves said each visible product to a selected location while taking into consideration a position and an orientation of said each visible product relative to the end of arm tool.

According to still another illustrative embodiment, there is provided a method for picking tightly-pack generally uniformed products in an opened container comprising sequentially gripping each one of the products based on depths of the products in the container, determining a position of each gripped product relative to the tool and moving each gripped product on an output station in accordance with a position of the gripped product relative to the tool.

Other objects, advantages and features of the vision-assisted system and method for picking of rubber bales in a bin will become more apparent upon reading the following non restrictive description of preferred embodiments thereof, given by way of example only with reference to the accompanying drawings.

BRIEF DESCRIPTION OF THE DRAWINGS

In the appended drawings:

FIG. 1 is a side perspective view of a bin picking system according to an illustrative embodiment; the system being shown with a bin of products;

FIG. 2 is a top perspective view of the bin picking system from FIG. 1;

FIGS. 3a and 3b are schematic top plan views of a first bin of products, illustrating a first positioning of the gripper tool relative to the products;

FIGS. 4a and 4b are schematic top plan views of a second bin of products, illustrating a second positioning of the gripper tool relative to the products;

FIG. 9 is a flowchart illustrating a bin picking method according to an illustrated embodiment.

DETAILED DESCRIPTION

Figure 5A:
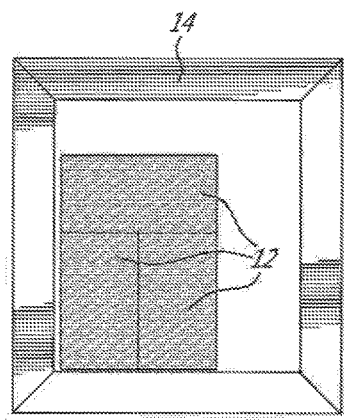
FIGS. 5a and 5b are schematic top plan views of a third bin of products, illustrating a third positioning of the gripper tool relative to the products.
Figure 5B:
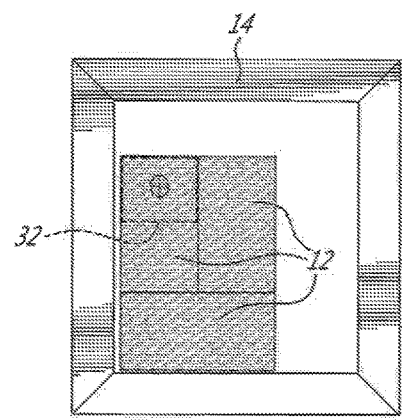
Figure 6A:
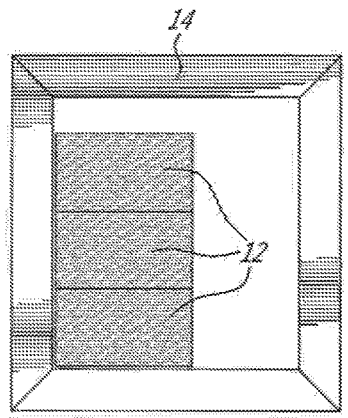
FIGS. 6a and 6b are schematic top plan views of a fourth bin of products, illustrating a fourth positioning of the gripper tool relative to the products.
Figure 6B:
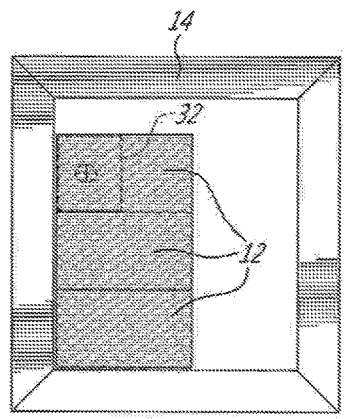
Figure 7:
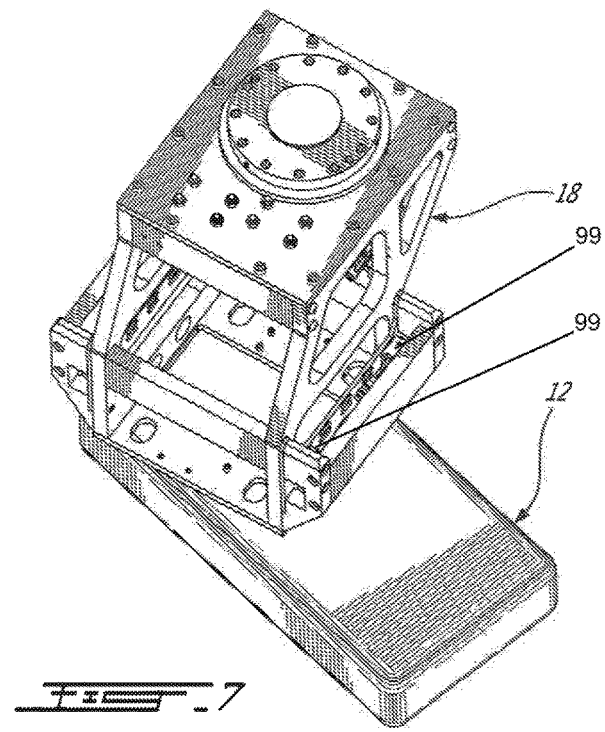
FIG. 7 is a perspective view of the gripping tool; the tool being shown picking a bale.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A system 10 for picking products 12 in a container 14 will now be described with reference to FIGS. 1 and 2.

The system 10 according to the first illustrated embodiment is adapted to picking, as an input, rubber bales 12 in a bin 14.

The system 10 comprises a robot 16 equipped with a gripper 18 and guided by a first sensor system 20 to remove the bales 12 one by one from the bin 14, and a second sensor system 22 to determine the final orientation and position of each bale in the gripper 18 and to instruct the robot 16 to properly transfer the bale 12 on an output conveyor (not shown) in a predetermined manner, yielding a flow of unitized bales aligned in a desired orientation on the output conveyor.

As will become more apparent upon reading the following description, the system 10 is not limited to picking rubber bales, and the expression "product" should be construed herein as including any type of bale, block, brick, pad, etc. The product 12 can be wrapped in a thin plastic film, but can be without it. Also, the plastic film can be in various colors.

The product dimensions may vary greatly between each different type of product. Typical dimensions (width× length×height) are between 6"×6"×5" (15.25 cm×15.25 cm×12.7 cm) and 24"×36"×9" (61 cm×91.5 cm×22.9 cm).

Typically, there are no substantial gaps between the products 12 in the incoming bin 14. Even though the system 10 allows picking in the bin 14 products 12 that are tightly pack, it can be used to pick products that are spaced in a bin.

The bin overall dimensions also vary. Typical dimensions (width×length×height) are between 44.625"×56.875"×39.5" (113.3 cm×144.5 cm×100.1 cm) and 45.75"×60.25"×44.25" (116.2 cm×153.0 cm×112.4 cm).

These dimensions are given for illustration purposes only. It is believed to be within the reach of a person skilled in the art to use the present teaching to adapt and more specifically to dimension the system 10 for products and/or bins having other dimensions.

The robot 16 is in the form of a standard 4 or 6 axis industrial articulated arm. A conventional robot arm can be used, such as ABB's or IRB 7600, FANUC's M900, or any similar robot arm.

The robot arm 16 is adapted for the application and, according to the first illustrative embodiment, is equipped with an end of arm tool in the form of the gripper 18, which is adapted to securely pick and transfer the rubber bales 12, wrapped or not in a thin plastic film, from the filled bin 14 to the output conveyor 98.

According to the first illustrative embodiment, the end of arm tool 18 includes a series of hooks that can firmly grip the rubber bale 12. According to another embodiment (not shown), the end of arm tool 18 includes needles, vacuum, screws or other means to pick the rubber bales 12. According to still another embodiment, the end of arm tool 18 is configured to grip products having a different configuration than rubber bales 12, such as, without limitations, boxes (not shown).

In the description and in the claim, the expressions 'robot' and 'robot arm' will be used interchangeably to means a programmable system including articulated and/or movable members that can receive, control and move a tool.

According to another embodiment, the articulated arm and tool forms are integrated in a single device, providing the combined features of the robot arm 16 and tool 18.

The robot arm 16 includes other well-known systems and components that allow its operation, including a robot controller. Since these systems and components are believed to be well-known in the art, they will not be described herein in more detail for concision purposes.

The robot arm 16 is positioned adjacent a bin unloading station where the bin 14 that includes the rubber bales 12 to be picked by the robot arm 16 is positioned. The bin 14 can be placed in the bin unloading station by a lift truck, an input bin conveyor, or any other means to transport a filled bin 14 (all not shown).

According to the first illustrated embodiment, the first sensor system 20 includes one or more image acquisition sensors 24 that are positioned over the bin unloading station so as to include the bin 14 in its field of view.

The first sensor system 20 allows acquiring sufficient data to reconstruct the image of the upper products in the bin 14, the upper products being the rubber bales 12 in the bin that are visible from above. According to the first illustrative embodiment, the image acquisition sensors 24 are time-of-flight type sensors, such as the Microsoft Kinect® camera. According to another embodiment, the sensors 24 are conventional industrial cameras generating 3D images (scanners, stereocameras, etc.).

The image acquisition sensors 24 are wired to a controller 26 or wirelessly coupled thereto (see lines 28) and both are configured for the transfer of acquired image data between the sensors 24 and the controller 26.

The controller 26 is configured or programmed for analyzing the image data acquired by the first sensor system 20, determines products' characteristics and uses such characteristics to determine robot-readable coordinates of the individual upper products in the bin 14. Examples of product characteristics determined by the controller 26 includes without limitations depth of the products within the bin, their positions and orientations within the bin, and the products horizontality. The controller 26 is wired or wirelessly coupled to the robot 16 (see lines 30) and is configured to send the upper products coordinates thereto or robot-readable information indicative thereof.

The expression "image" should be construed in the description and in the claims as including any type of data that forms a more or less precise two-dimensional (2D) or three-dimensional (3D) representation of one or more subjects including 2D or 3D conventional grey-tone or color images, depth maps, topography images, height data, or any other partial or complete reproduction of the subjects.

The expression "controller" should be construed broadly as including one or more electronic devices, including for example one or more computers that are configured with components and/or programmed with instructions that produce one or more functionalities.

The first sensor system 20 is not limited to being fixed to a structure above the bin unloading station. According to a further embodiment, the first sensor system 20 is part of the tool 18. According to such an embodiment, the first sensor system 20 includes for example four cameras or other sensors 99 that are mounted to the tool 18 so as that their positions define a rectangle or another shape. The images or depth values obtained from such a sensor system can be used in same side pairs to better assess, validate and/or correct gripping point on a selected bale 12 for the tool 18.

According to still another embodiment, the image acquisition sensors 24 are in the form of a series of laser sensors mounted to the tool 18 and that measures the depths of the upper products 12 in the bin 14 for a plurality of points thereon. In this later case, the robot 16 moves the sensors 24 over the bin 14 via the tool 18 to grab the depths of the products. This is obviously achieved before a first product 12 is gripped. This yields a depth map of the upper surface of the products 12 in the bin which is used by the controller 26 to determine the coordinates of the upper products 12.

The controller 26 may be programmed to request a new image acquisition by the first sensor system 20 according to predetermined criteria, such as the arrival of a new bin in the bin unloading station, a problematic scan, etc.

According to another embodiment, the controller 26 commands the robot 16 to move during the image acquisition so as to improve or supplement an initial field of view.

In some cases, the image acquisition sensors 24 cannot adequately identify the location and orientation of the individual products 12 on the top region of the filled bin 14 when those products 12 are so close to each other that there is no visible edge that separates them.

As an example which is illustrated in FIGS. 3a and 4a, two side-by-side rubber bales could be placed horizontally or vertically. The image acquisition sensors' controller 26 is configured to evaluate, in such cases, where a "half bale" is most probably located (see dashed lines 32 in FIGS. 3b and 4b) and sends the corresponding coordinates to the robot 16, which then picks the product 12 based on the position of the "half bale". The evaluation of the most probable location of the half bale is determined using for example the theoretical pattern of the products in the bin. This can be provided by the product manufacturer.

It results from this last bale picking strategy that the exact orientation and position of the product 12 in the end of arm tool 18 are not known.

The situation shown in FIGS. 3a-3b and 4a-4b is shown for illustration purposes only, and various other product positions could lead to the same difficulty of identifying the next product 12 to be picked. FIGS. 5a-5b and 6a-6b illustrate other examples of such a situation.

To cope with such situations, a second sensor system 22, including an image acquisition sensor, is provided (see in FIG. 1) to determine precisely the product's position and orientation before it is placed on the output conveyor (not shown).

According to the first illustrative embodiment, such a bale position sensor system 22 includes an image acquisition sensor in the form of a 2D camera with front lighting. According to another embodiment, the sensor system 22 includes infrared light sources and infrared filter on the camera. According to still another embodiment, the sensor system 22 includes a conventional industrial 2D camera. Other type of sensor can also be used, such as time of flight, scanner, laser sheet, etc.

Figure 8:
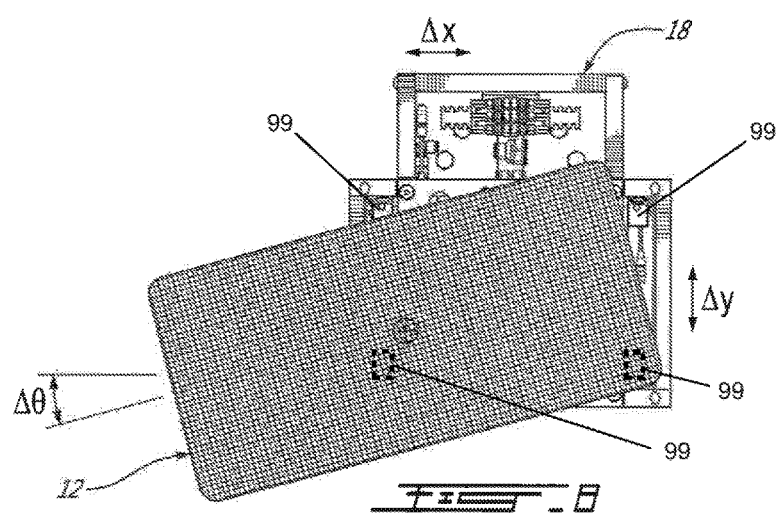
FIG. 8 is a bottom plan view of the gripping tool in the configuration of FIG. 7, further showing the position and orientation offsets detected by the bale position vision system.

The second sensor system 22 is secured adjacent the robot 16 and bin unloading station and is oriented so as to take an image of the tool 18 and a picked bale 12 from below. A lighting system (not shown) is positioned in such a way to provide front lighting of the product 12 for the bale position vision system 22 so that it can see the product 12 and determine its position relative to the end of arm tool 18. According to the first illustrated embodiment, this is achieved using edge detection and by measuring the differences in the distances $\Delta x$ and $\Delta y$ between the centers of the tool 18 and product 12 and of the angle $\Delta \theta$ therebetween as illustrated in FIG. 8. According to some embodiments, the sensor system 22 also confirms that a bale is actually picked by the end of arm tool. The relative position of the bale in the end of arm tool 18 is also considered when the robot arm 16 moves the image acquisition sensors 24 when it is mounted on the end of arm tool 18 to determine where the next bale to be picked should most probably be located.

The second sensor system 22 is wired to the controller 26 or wirelessly coupled thereto and is configured for the transfer of acquired image data to the controller 26.

The controller 26 processes the image from the system 22, so that the rubber bale 12 appears as a black rectangle in the image as shown in FIG. 8. By measuring the product's length and width, the controller 26 determines the product's position relative to the end of arm tool 18 by measuring $\Delta x$, $\Delta y$ and $\Delta \theta$.

Once the product's position relative to the tool 18 is determined by the controller 26, the controller 26 calculates and sends to the robot arm 16 movement displacement instructions that will precisely place the rubber bale 12 at predetermined location and orientation on the output conveyor (not shown). These instructions take into consideration the position of the product 12 in the tool 18.

According to another embodiment, the second sensor system 22 includes or is coupled to a dedicated controller that processes the image acquired thereby.

The output conveyor is in the form of a linear conveyor that is adapted to receive the products placed one by one thereon by the system 10. According to another embodiment (not shown), the output conveyor is replaced by an output table or any other means adapted to receive the products, such as without limitations an automated guided vehicle (AGV). According to still another embodiment (not shown), two output conveyors (or more) or other output means are used.

The flow chart of FIG. 9 describes a vision-assisted bin picking method 100 according to a first illustrated embodiment which will now be described in more detail with reference also to the operation of the system 10.

In step 102, a bin 14 loaded with rubber bales 12 is forwarded next to the robot 16 at the bin unloading station. The first image acquisition sensors 24 take pictures of the upper products 12 in the bin 14 and more specifically obtains a depth map of the upper products 12 (step 104). In step 106, the controller 26 uses the depth map to determine the next product 12 to be removed among the upper products 12.

According to some embodiment, the controller 26 chooses the highest product or, if all upper products 12 are at the same depth, than the controller chooses the product 12 whose depth has been determined with the highest certainty. This can be determined using a conventional edge detection method. Alternatively or additionally to such method, for example when it is inconclusive, a product 12 on the edge of the bin is selected.

Instructions are then sent to the robot 16 (step 108) by the controller 26 which then grips the corresponding product 12 (see FIG. 1) using the tool 18, and moves it above the second sensor system 22 (step 110) (see FIG. 2).

When a product cannot be identified in step 106, the bin 14 is considered empty (step 118) and the system 10 waits for the arrival of a new bin 14 with products 12 (step 120).

In step 112, an image is taken by the second sensor system 22 and sent to the controller 26, which then determines in step 114 the position and orientation of the product 12 relative to the tool 18. The controller 26 uses this information in determining the displacement requires by the robot 16 to position the product 12 at a predetermined location and with a predetermined orientation on the output conveyor. In step 116, the robot 16 moves the product 12 onto the output conveyor at the determined location.

Each time a product 12 is moved on the output conveyor, the method proceed with step 118, wherein the controller 26 determines whether the bin is empty, and if so, wait for a new loaded bin (step 120). If not then the method returns to step 104. The bin 14 is determined to be empty when the highest depth equals the known distance of the bottom of the bin 14 for example.

A vision-assisted bin picking method according to a second illustrative embodiment will now be described. This method is executed using the previously mentioned embodiment of the system where the first sensor system 20 is located on the gripper 18. Since the first and second illustrative embodiments of the method are similar, only the differences therebetween will now be described for concision purposes.

In step 104, the depth measures of the upper products 12 in the bin 14 are taken as the robot 16 moves the gripper 18 to a series of positions so as to vary the point and field of view of the first sensor system 20.

According to the position of the previously picked product 12 in the bin 14 and the product orientation determined by the second sensor system 22, the controller 26 evaluates in step 106 the most probable position of the next product 12 to be picked as described hereinabove.

Once a product 12 is dropped on the output conveyor, the robot 16 moves the gripper 18 over the most probable position of the next product to be picked.

The first sensor system 20 is used to take depth measures at this most probable position in order to confirm the position of the next product to be picked.

If this confirmation is found to be true, the controller 26 commands the robot 16 to pick this next product 12 and the following steps described in the first embodiment are followed.

If this confirmation is found to be false, new depth measures are taken by the first sensor system 20, but slightly offset from the previous ones.

Those last three steps are repeated until the sensor system 22 confirms the position of the next product to be picked or until the search process iterations exceeds a predetermined value, as inputted for example by the operator. In this later case, an alarm is sent to the operator for a manual intervention.

It is to be noted that many other modifications could be made to the vision-assisted bin picking systems and methods described hereinabove and illustrated in the appended drawings. For example:
- to increase the production rate, two robot arms can be used for example along with two or more output conveyors;
- for gripping the products, the end of arm tool can include needles, screw, cork-screws, vacuum pad, suction cups or a combination thereof;
- the articulated robot arm can be replaced by a gantry type system; and
- the products that are brought at the picking station can be in a bin, a bin pallet, a box pallet, a pallet or any other means to transport such products.

It is to be understood that embodiments of the vision-assisted bin picking system and method are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

What is claimed is:

1. A system for picking products in a container, the system comprising:
   a first sensor system configured to obtain an image of upper products in the container and determine, based on the image, in container position dimension information of the upper products that defines a position of the upper products within the container with respect to a predetermined frame of reference of the container, the upper products being the products in the container constricting a field of view of the upper products in the container so that the upper products in the container are visible but from above the container;
   a robot coupled to the first sensor system configured for receiving therefrom the in container position dimension information of the upper products with respect to the predetermined frame of reference of the container and for sequentially gripping the upper products based on the in container position dimension information of the upper products; and a second sensor system configured for determining a position of each of the upper products relative to the robot with said each of the upper products being gripped by the robot so that the position of each of the upper products relative to the robot determined by the second sensor system is effected by the second sensor system independent of the first sensor system, and the position determination by the second sensor system defines pose characterizing information that characterizes a grip pose of each gripped upper product, coincident with and as gripped by the robot, with respect to a predetermined reference frame of the robot that is different than the predetermined reference frame of the container; and the robot being further configured to position, at a selected location, the upper product that is gripped by the robot based on information indicative of the position determined by the second sensor.

2. The system as recited in claim 1, wherein the first sensor system includes at least one image acquisition sensor.

3. The system as recited in claim 2, wherein the first sensor system includes a controller coupled to both the at least one image acquisition sensor and to the robot i) for receiving the image from the at least one image acquisition sensor, and ii) for analyzing the image so as to determine and send to the robot the in container position dimension information of the upper products.

4. The system as recited in claim 2, wherein the at least one of the image acquisition sensors is mounted above the container and adjacent the robot.

5. The system as recited in claim 1, wherein the image is selected from the group consisting of a conventional grey-Lone image, a conventional color image, a depth map, height data, and a topography image.

6. The system as recited in claim 1, wherein the first sensor system includes at least one of a camera, a time of flight type sensor, a scanner, and a stereo camera.

7. The system as recited in claim 1, wherein the image of the upper products includes depths of the upper products in the container.

8. The system as recited in claim 1, wherein the robot is equipped with a gripping tool that allows said gripping the upper products.

9. The system as recited in claim 8, wherein the gripping tool includes at least one of hooks, needles, screw, cork screws, a vacuum pad, and suction cups.

10. The system as recited in claim 8, wherein the first sensor system includes at least one image acquisition sensor mounted to the gripping tool.

11. The system as recited in claim 10, wherein the at least one image acquisition sensor mounted to the gripping tool includes four sensors together defining a rectangular configuration.

12. The system as recited in claim 1, wherein the second sensor system includes a controller coupled to the robot for said determining information indicative of the position determined by the second sensor and for transmitting to said robot said information indicative of the position determined by the second sensor.

13. The system as recited in claim 1, wherein the robot sequentially grips an upper product subsequent to said each of the upper products based on the information indicative of the position of each of the upper products relative to the robot.

14. The system as recited in claim 1, further comprising an output conveyor located within a reach of the robot; the selected location being on the output conveyor.

15. The system as recited in claim 1, wherein the products are rubber bales.

16. The system as recited in claim 15, wherein the in container position dimension information of the upper products includes a probable location of half of each of the rubber bales.

17. The system as recited in claim 16, wherein the probable location of half of each of the rubber bales is determined using a theoretical pattern of the products in the container.

18. A robot, equipped with an end of arm tool, that sequentially picks products in a bin, constricting a field of view of the upper products in the bin so that the products in the bin are visible but from above the bin, based on in bin position dimension information of the visible products determined by a first sensor system and that defines a position of the upper products within the bin with respect to a predetermined frame of reference of the container, and, while each visible product is being picked, that moves said each visible product to a selected location while based on a position and an orientation of said each visible product relative to the end of arm tool determined by a second sensor system, where the position and orientation of said each visible product relative to the end of arm tool determined by the second sensor system is effected by the second sensor system independent of the first sensor system, and the position and the orientation determination by the second sensor system defines pose characterizing information that characterizes a grip pose of each gripped visible product, coincident with and as gripped by the end of arm tool, with respect to a predetermined reference frame of the end of arm tool that is different than the predetermined frame of reference of the container.

19. A method for picking tightly-pack generally uniformed products in an opened container comprising:
sequentially gripping with a tool each one of the products based on depths of the products in the container, constricting a field of view of the upper products in the container so that the upper products in the container are visible but from above the container, where the depths of the products in the container are determined by a first sensor system with respect to a predetermined reference frame of the container;

determining a position of each gripped product relative to the tool with a second sensor system so that the position of each gripped product relative to the tool determined by the second sensor system is effected by the second sensor system independent of the first sensor system, and the position determination by the second sensor system defines pose characterizing information that characterizes a grip pose of the each gripped product, coincident with and as gripped by the tool, with respect to a predetermined reference frame of the tool that is different than the predetermined reference frame of the container; and moving each gripped product on an output station in accordance with a position of the gripped product relative to the tool.

20. The method as recited in claim 19, further comprising determining the depths of the products in the container by analyzing an image taken from above the container.

21. The method as recited in claim 20, wherein said image taken from above the container being achieved by measuring depth values at different positions in the opened container from different point of views.

22. The method as recited in claim 19, further comprising evaluating a most probable position of at least one of said each one of the products before gripping said at least one of the products.

23. The method as recited in claim 19, wherein said determining a position of each gripped product relative to the tool being achieved by analyzing an image taken of said each gripped products.

24. The method as recited in claim 23, wherein the image is taken by moving at least one laser sensor over the products.

25. The method as recited in claim 19, wherein gripping a subsequent product of each one of the products is based on the position of each gripped product relative to the tool.

26. The method as recited in claim 19, wherein the container is selected from the group consisting of a bin, a bin pallet, a box pallet, or a pallet.

\* \* \* \* \*